(12) United States Patent
Lei et al.

(10) Patent No.: US 10,962,986 B2
(45) Date of Patent: Mar. 30, 2021

(54) VEHICLE NETWORK SHARING

(71) Applicant: Ford Global Technologies, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 144 days.

(21) Appl. No.: 16/106,913

(22) Filed: Aug. 21, 2018

(65) Prior Publication Data
US 2020/0064865 A1 Feb. 27, 2020

(51) Int. Cl.
*G05D 1/02* (2020.01)
*H04W 52/38* (2009.01)
*H04W 48/08* (2009.01)
*H04W 4/46* (2018.01)

(52) U.S. Cl.
CPC ............ *G05D 1/0295* (2013.01); *H04W 4/46* (2018.02); *H04W 48/08* (2013.01); *H04W 52/383* (2013.01)

(58) Field of Classification Search
CPC .... G05D 1/0295; H04W 4/46; H04W 52/383; H04W 48/08
See application file for complete search history.

(56) References Cited

U.S. PATENT DOCUMENTS

| 8,995,956 | B2 | 3/2015 | Lavi et al. | |
| 9,439,121 | B2 | 9/2016 | Sargento et al. | |
| 2014/0164582 | A1* | 6/2014 | Dawson | H04W 48/18 709/221 |
| 2014/0200760 | A1* | 7/2014 | Kaufmann | G07C 5/008 701/29.3 |
| 2019/0319723 | A1* | 10/2019 | Axmon | H04B 17/309 |

FOREIGN PATENT DOCUMENTS

WO 2017176329 A1 10/2017

* cited by examiner

*Primary Examiner* — Jianye Wu
(74) *Attorney, Agent, or Firm* — Brooks Kushman PC; Michael Spenner

(57) ABSTRACT

A vehicle comprises a processor, programmed to responsive to detecting a fleet within a predefined range, join the fleet via a wireless connection, and optimize network configuration of the fleet by activating a first network technology on the vehicle, deactivating a second network technology, and commanding at least one vehicle of the fleet via the wireless connection to deactivate the first network technology.

19 Claims, 3 Drawing Sheets

VEHICLE NETWORK SHARING

TECHNICAL FIELD

The present disclosure generally relates to vehicle network sharing. More specifically, the present disclosure relates to multiple vehicles sharing network access to improve signal coverage and throughput.

BACKGROUND

Governmental authorities in many countries have regulations on wireless radio transmission. Taking the United States for instance, the Federal Communications Commission (FCC) sets a maximum transmit power of 23 dBm for mobile devices including mobile phones and telematics control units (TCU) of a vehicle. In cases where mobile device supports multiple wireless technologies, such as the fourth generation of broadband cellular network technology (4G) and the fifth generation of broadband cellular network technology (5G) at the same time, the mobile device may be required to reduce transmit power of at least one wireless technology to comply with governmental regulations.

SUMMARY

In one or more illustrative embodiment, a vehicle comprises a processor, programmed to responsive to detecting a fleet within a predefined range, join the fleet via a wireless connection, and optimize network configuration of the fleet by activating a first network technology on the vehicle, deactivating a second network technology, and commanding at least one vehicle of the fleet via the wireless connection to deactivate the first network technology.

In one or more illustrative embodiment, a method for a vehicle comprises joining a fleet via a wireless connection responsive to detecting the fleet being within a predefined distance range of the vehicle; receiving data sent from at least one vehicle of the fleet via the wireless connection indicative of cellular network configuration of the at least one vehicle of the fleet; and optimizing wireless configuration of the fleet by deactivating at least one cellular network technology of the at least one vehicle of the fleet supporting multiple cellular network technologies while keeping other cellular network technologies activated with a higher transmission power.

In one or more illustrative embodiment, a vehicle comprises a processor, programmed to responsive to detecting a fleet within a predefined range, join the fleet via a wireless connection, and optimize network configuration of the fleet by responsive to receiving a message from at least one vehicle of the fleet, deactivating a first network technology on the vehicle; and increasing transmission power of a second network technology.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for network sharing. More specifically, the present disclosure proposes a system to allow network access sharing between multiple vehicles, in which one vehicle enables one network technology, such as 4G network, and the other vehicle enables another network technology, such as 5G network while the two vehicles communicates via vehicle to vehicle (V2V) technology. The term network technology in the present disclosure may include any present and future cellular (e.g. 3G, 4G, and/or 5G) and other types of communication technology (e.g. WiFi, LiFi, and/or Satellite communication).

Figure 1:
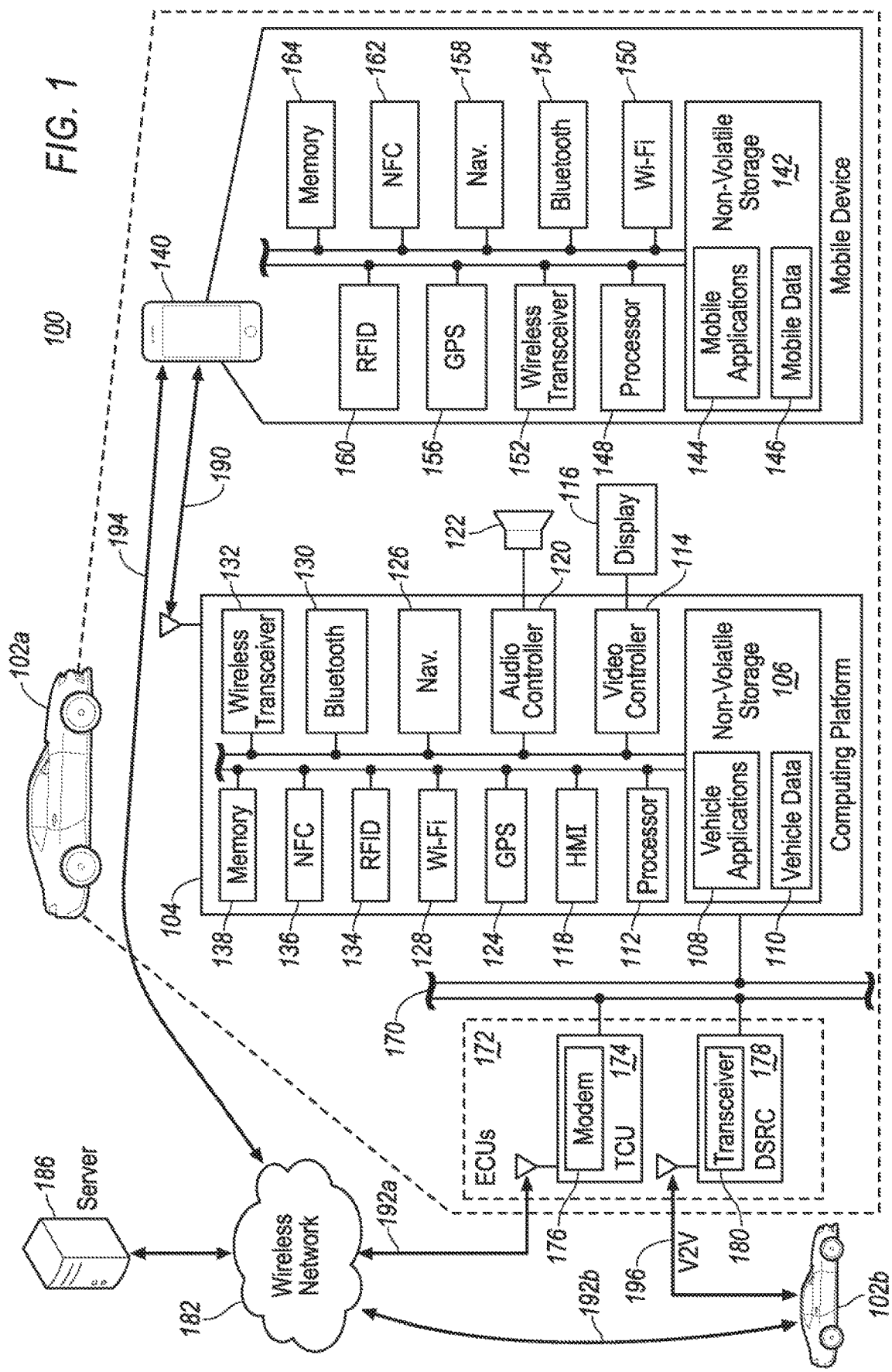
FIG. 1 illustrates an example block topology of a vehicle system of one embodiment of the present disclosure.

Referring to FIG. 1, an example block topology of a vehicle system 100 of one embodiment of the present disclosure is illustrated. Vehicles 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, vehicles 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

Different vehicles 102 may vary in configurations. The following embodiment is illustrated with reference to vehicle 102*a*. As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with vehicle 102*a*. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning functions through a navigation controller 126 configured to calculate navigation routes responsive to user input via e.g. the HMI controls 118, and output planned routes and instructions via the speaker 122 and the display 116. Location data that is needed for navigation may be collected from a global positioning system (GPS) controller 124 configured to communicate with GPS satellites and calculate the location of vehicle 102*a*. Map data used for route planning may be stored in the storage 106 as a part of the vehicle data 110. Navigation software may be stored in the storage 116 as a part of the vehicle applications 108. Additionally, the location and planned route may be wirelessly reported to a wireless network 182 for analysis and sharing purposes.

The computing platform 104 may be configured to communicate with a mobile device 140 of the vehicle users/occupants via a wireless connection 190. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 132 in communication with a WiFi controller 128, a Bluetooth controller 130, a radio-frequency identification (RFID) controller 134, a near-field communication (NFC) controller 136, and other controllers such as a Zigbee transceiver, an IrDA transceiver (not shown), configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GPS controller 156 controlled by application as a part of a mobile application 144 stored in a non-volatile storage 142. Map data used for navigation purposes may be stored in the storage 142 as a part of mobile data 146. Alternatively, the mobile device 140 may be configured to download live map and traffic data from a remote server via a wireless network 182 through a wireless connection 194.

The mobile device 140 may be provided with a wireless transceiver 152 in communication with a WiFi controller 150, a Bluetooth controller 154, a RFID controller 160, a NFC controller 162, and other controllers (not shown), configured to communicate with the wireless transceiver 132 of the computing platform 104 and other compatible transceivers (not shown).

The computing platform 104 may be further configured to communicate with various electronic control units (ECUs) 172 via one or more in-vehicle network 170. The in-vehicle network 170 may include, but is not limited to, one or more of a controller area network (CAN), an Ethernet network, and a media oriented system transport (MOST), as some examples.

Vehicle 102*a* may include multiple ECUs 172 configured to control and operate various functions of the vehicle 102*a*. As a few non-limiting examples, the ECUs 172 may include a telematics control unit (TCU) configured to control telecommunication between vehicle 102*a* and a wireless network 182 through a wireless connection 192*a* using a modem 176. The wireless network 182 may be a cellular (e.g. 3G, 4G, and/or 5G) network enabling the communication between a remote server 186 and the computing platform 104. Alternatively, the wireless network 182 may be any existing or future communication network that the TCU 172 is configured to support to telecommunication purposes. Additionally, the ECUs 172 may include a dedicated short range communications (DSRC) controller 178 having a transceiver 180 configured to communicate with compatible controllers of other vehicles via a V2V wireless connection 196. For instance, the DSRC controller 178 is configured to communicate with a fleet vehicle 102*b* via the V2V connection 196 as illustrated. Additionally or alternatively, wireless connections may be established between multiple vehicles 102 using other types of technologies, such as WiFi, Bluetooth, RFID, NFC and etc.

Figure 2:
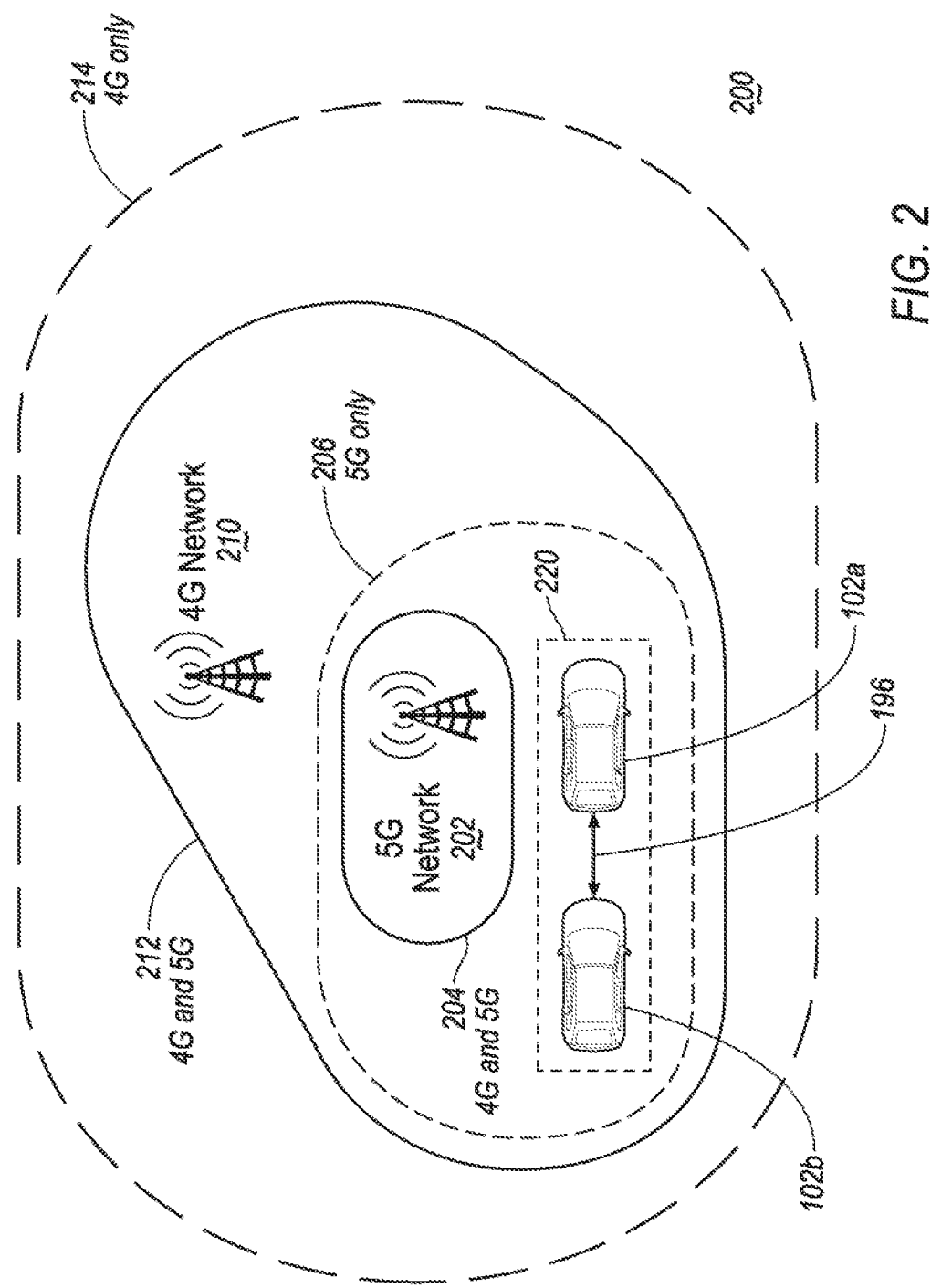
FIG. 2 illustrates an example topology of the vehicle system of one embodiment of the present disclosure.

Referring to FIG. 2, a topology diagram 200 of the vehicle system of one embodiment of the present disclosure is illustrated. In the present example, both of two vehicles 102*a* and 102*b* may be configured to support 4G and 5G cellular wireless network technology. As illustrated, a 5G network 202 and a 4G network 210 cover a general area in FIG. 2 and overlaps each other in some area. The 5G cellular network 202 may have a smaller coverage area using higher radio frequency (e.g. mmWave such as 28 GHz, 39 GHz) as compared to the 4G wireless network 210 using lower radio frequency (e.g. 600-850 MHz). It is noted that cellular signals may be transmitted by multiple towers to cover the same area creating overlaps in reality. For illustration purposes, only one 4G network 210 and one 5G network 202 are illustrated. The 5G wireless network 202 may have different coverage ranges for different receiver configurations. For instance, when a receiver (e.g. a vehicle TCU or mobile device) is configured to have both 4G and 5G network enabled, the coverage for the 5G network 202 may be generally illustrated by circle 204 due to governmental regulations on maximum device transmission power. However, when the receiver is configured to only enable the 5G wireless network technology, the network coverage may be significantly larger as illustrated by dashed circle 206. The same principle applies to 4G network 210 which generally has a smaller coverage 212 when both the 4G and 5G transmission are enabled, and a larger coverage 214 when only the 4G transmission is enabled at the receiver.

With continuing reference to FIG. 1, two vehicles 102a and 102b are used for illustration. While travelling, vehicles 102a and 102b may be located within a predefined proximity enabling V2V connection 196 via various technology, such as DSRC or WiFi. The predefined proximity may vary due to the type of technology used for wireless V2V connection. For instance, for DSRC connections, the predefined proximity may be up to around 300 meters, whereas the predefined proximity for a WiFi connection may be around 50 meters. Additionally, the vehicles 102a and 102b may predict to connect to each other using location and navigation data shared via the wireless network 182. Taking the vehicle 102a for instance, responsible to detecting and establishing the wireless connection 196 with the fleet vehicle 102b, the computing platform 104 may communicate with the fleet vehicle 102b to determine what wireless technology the vehicle 102b support and what the connection/coverage status is. As illustrated in FIG. 2, both the vehicle 102a and the fleet vehicle 102b are located within the coverage area 206 available for the TCU 174 when only 5G connection is enabled. The computing platform 104 of the vehicle 102a may disable one of 5G or 4G transmission. For instance, the computing platform 104 may disable the 4G transmission, enable only the 5G transmission to connected to the 5G network 202 for better throughput and send a message to the fleet vehicle 102b to inform about the configuration. In response, the fleet vehicle 102b may disable the 5G transmission and only enable the 4G transmission for better coverage while communicating with the vehicle 102a via the V2V connection 196. In this case, the vehicle 102a and the fleet vehicle 102b may be deemed as a single combined vehicle 220 from the network perspective.

As the vehicles 102a and 102b travel, the network coverage condition may change and the computing platform 104 of the vehicle 102a as well as the fleet vehicle 102b may dynamically adjust the network configurations to optimize both the throughput and the coverage. In some cases, the combined vehicle 220 may break apart when the two vehicles 102a and 102b are beyond the predefined distance, and reconnect when they re-enter the predefined proximity of each other. Since 4G network (e.g. with lower radio frequency) coverage is normally broader as compared to 5G (e.g. with higher radio frequency), the fleet vehicle 102b having only 4G network enabled may be configured to communicate telematics messaging of the combined vehicle 220 to the backend server (e.g. the remote server 186), while the vehicle 102a having only 5G network enabled may be configured to communicate media data (e.g. map, navigation, music and etc.) of the combined vehicle 220 to the remote server 186.

Figure 3:
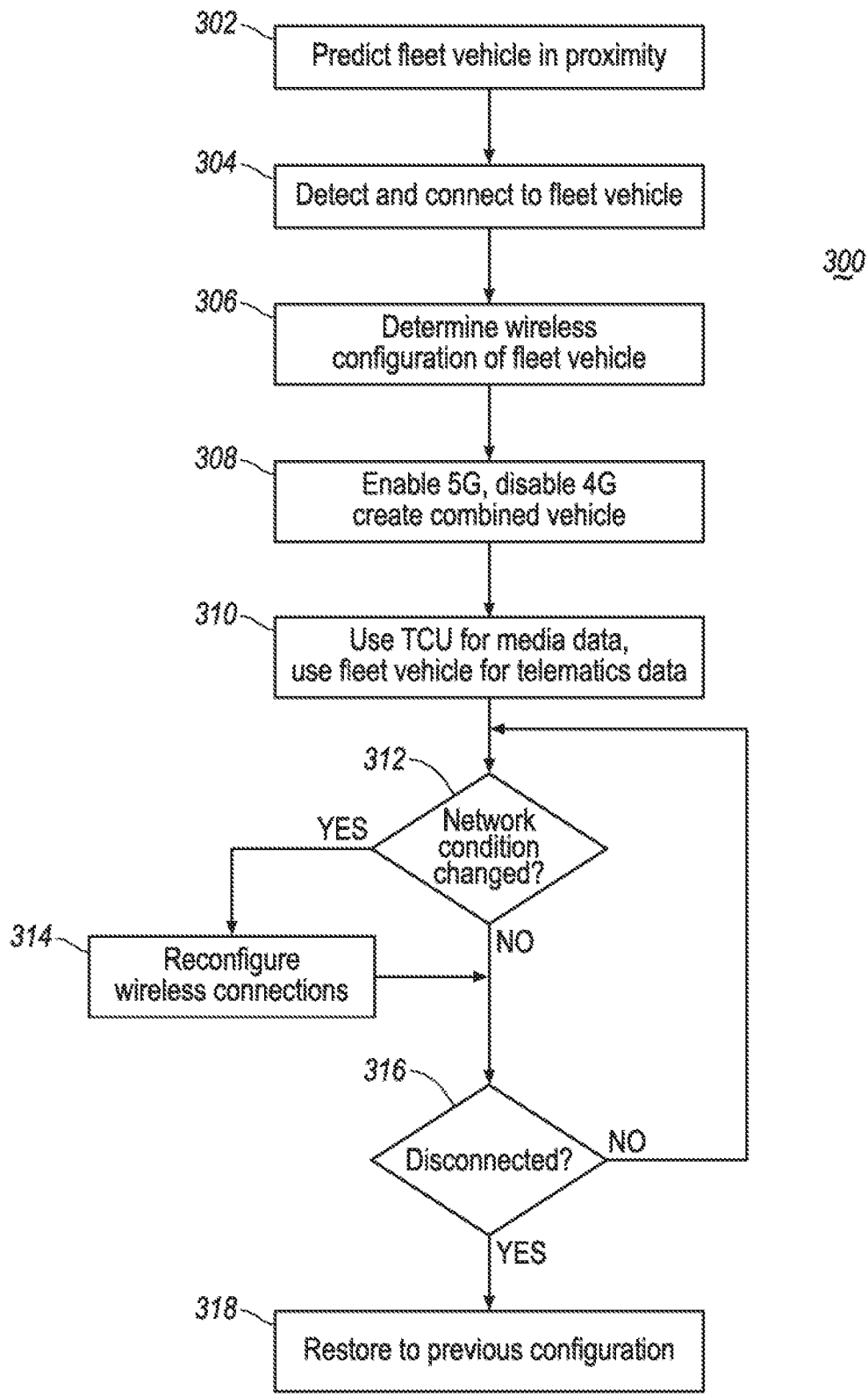
FIG. 3 illustrates an example flow diagram of vehicle network sharing of one embodiment of the present disclosure.

Referring to FIG. 3, an example flow diagram for a process 300 for vehicle network sharing of the present disclosure is illustrated. With continuing reference to FIGS. 1 and 2, using the vehicle 102a for demonstrative purposes, at operation 302, the computing platform 104 of the vehicle 102a predicts the fleet vehicle 102b to be within a predefined proximity at a calculated time using the location and navigation route data shared via the wireless network 182. The computing platform 104 may be configured to send location data from the GPS controller 124 and planned route from the navigation controller 126 to the server 186 via the wireless network 182 and share with other fleet vehicles. Using the shared location and route, fleet vehicles may predict and detect each other for network sharing. Responsive to a positive prediction result indicating both the vehicle 102a and the fleet vehicle 102b to be within a predefined proximity, the computing platform 104 may prepare to establish the wireless V2V connection 196 between the two vehicles by enabling the connection mode. Additionally, network coverage information (e.g. a coverage map) may be available for the computing platform 104 to download from the server 186 to prepare to optimize the network configuration in advance before the V2V connection 196 is established.

At operation 304, the computing platform 104 of the vehicle 102a detects the fleet vehicle 102b within the predefined proximity and establish the V2V connection 196 between the vehicles. As an example, the V2V connection 196 may be a DSRC connection through the DSRC controller 178 while other types of wireless connection may additionally or alternatively be used. Responsive to establishing the V2V connection 196, the computing platform 104 receives information about the wireless connections of the fleet vehicle 102b and determine the optimized configuration to for the combined vehicle 220. For instance, the computing platform 104 may determine both vehicles support 4G and 5G cellular network and both vehicles are located in an area having 4G and 5G general coverage as illustrated in FIG. 2, and further determine that the optimized configuration is to let the vehicle 102a to enable only 5G network and the fleet vehicle 102b to enable only 4G network using preconfigured algorithms. Alternatively, vehicles may be configured to share information about the wireless connections to each other via the wireless network 182 in advance and the computing platform 104 may determine the optimized configuration before the V2V connection 196 is established.

At operation 308, the computing platform 104 disables 4G network and enables only 5G network so that the TCU 172 can transmit the maximum transmission power allowed by regulations on 5G only network when needed, and sends a signal to the fleet vehicle 102b to do the opposite, namely, to disable 5G network and enables only 4G network. From the network's perspective, a combined vehicle 220 enabling both 4G and 5G network is created. The combined vehicle 220 uses the 4G network via the fleet vehicle 102b to communicate telematics data for better and more reliable coverage, and the 5G network via the vehicle 102a to communicate media data at operation 310.

The network condition for the combined vehicle 220 may change while traveling to different area with different network condition and coverage. For instance, the combined vehicle 220 may travel along a road into an area where 5G network is no longer available and 3G network is still available. Responsive to detecting the change of network condition at operation 312, the process proceeds to operation 314 and the computing platform 104 reconfigure the wireless connections for both vehicles 102a and 102b. For instance, the computing platform 104 may disable the 5G network and enable 3G network of TCU 174 if it is supported.

Despite being deemed as a combined vehicle 220, the vehicle 102a and the fleet vehicle 102b are still individual vehicles operated by different users and may depart from each other at some point. Responsive to the distance of the two vehicles extending beyond the predefined proximity and the V2V connection 196 is disconnected at operation 316, the process proceeds to operation 318 and the computing platform 104 restores to previous configuration by re-enabling 5G network.

The principle of wireless network sharing of the present disclosure also applies to other mobile devices. For instance, the network sharing may be performed between the computing platform 104 and the mobile device 140 under the same general principle discussed above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A first vehicle, comprising
   a wireless transceiver configured to support a first cellular network technology and a second cellular network technology, the first and second cellular network technologies having a combined transmission power threshold; and
   a processor, programmed to:
   responsive to receiving a location and a navigation route from a second vehicle, predict to travel within a predefined range from the second vehicle for a period of time greater than a predefined threshold,
   responsive to detecting the second vehicle within the predefined range,
     connect to the second vehicle via a wireless connection to form a fleet, the wireless connection being different from the first and second cellular network technologies,
     deactivate the second cellular network technology on the first vehicle,
     increase a transmission power of the first cellular network technology within the combined transmission power, and
     send a command to the second vehicle via the wireless connection to request to deactivate the first cellular network technology.

2. The first vehicle of claim 1, wherein the processor is further programmed to:
   send data communicated via the first network technology to the second vehicle; and
   receive data communicated via the second network technology from the second vehicle.

3. The first vehicle of claim 1, wherein the processor is further programmed to generate an optimized network configuration of the fleet with a predefined algorithm using network coverage information from the second vehicle.

4. The first vehicle of claim 1, wherein the processor is further programmed to generate the optimized network configuration with a predefined algorithm using network coverage data received from a server.

5. The first vehicle of claim 1, wherein the processor is further programmed to, responsive to a detection of network coverage status change, modify an activation status of at least one network technology on the second vehicle.

6. The first vehicle of claim 1, wherein the first cellular network technology is one of: third generation of broadband cellular network technology (3G) or fourth generation of broadband cellular network technology (4G).

7. The first vehicle of claim 6, wherein the second cellular network technology is fifth generation of broadband cellular network technology (5G).

8. The first vehicle of claim 1, wherein the wireless connection between the vehicle and the fleet vehicle includes at least one of: a dedicated short range communications (DSRC) connection, a WiFi connection, a Bluetooth connection, a near field communication (NFC) connection, and a radio frequency identification (RFID) connection.

9. A method for a first vehicle, comprising:
   connect to a second vehicle via a wireless connection responsive to detecting the second vehicle being within a predefined distance range of the first vehicle to form a fleet;
   responsive to receiving data sent from the second vehicle via the wireless connection indicative of a deactivation of cellular transmission of a first technology on the second vehicle, optimizing wireless configuration of the fleet by deactivating cellular transmission of a second technology on the first vehicle, while keeping cellular transmission of the first technology activated on the first vehicle with a higher transmission power within a predefined threshold, wherein the first technology is different from the second technology, and the wireless connection is established without involving the first and second technologies.

10. The method of claim 9, further comprising:
    responsive to receiving a fleet navigation information of the second vehicle from a server, analyzing the fleet navigation information against a navigation route of the first vehicle; and
    responsive to identifying the first vehicle is to travel within a predefined range from the second vehicle for a period of time greater than a predefined threshold, predicting the connect to the second vehicle.

11. The method of claim 9, further comprising:
    recording a status of cellular network connection configuration of the vehicle before optimizing the wireless configuration; and
    restoring the cellular network connection configuration to recorded status responsive to determining a disconnection from the fleet.

12. The method of claim 9, further comprising, responsive to detecting a network coverage status change, modifying an activation status of at least one network technology of at least one vehicle of the fleet.

13. The method of claim 9, further comprising generating an optimized network configuration with a predefined algorithm using network coverage information received from a server.

14. A first vehicle, comprising
    a wireless transceiver configured to support a first network technology and a second network technology, the first and second network technologies having a combined transmission power threshold; and a processor, programmed to:
    responsive to detecting a second vehicle within a predefined range, connect to the second vehicle via a wireless connection to form a fleet, and optimize network configuration of the fleet by
        responsive to receiving, from the second vehicle, a message indicative of a second cellular network technology is deactivated and the first cellular network technology is kept activated on the second vehicle, deactivating a first network technology on the first vehicle; and
        increasing transmission power of a second network technology on the first vehicle,
    wherein the wireless connection is established without involving the first or second network technologies.

15. The first vehicle of claim 14, wherein the processor is further programmed to:
    receive data communicated via the first network technology from the second vehicle; and
    send data communicated via the second network technology to the second vehicle.

16. The first vehicle of claim 14, wherein the processor is further programmed to:
    responsive to receiving a fleet navigation information of the second vehicle from a server, analyze the fleet navigation information against a navigation route of the first vehicle; and
    responsive to identifying the first vehicle is to travel within a predefined range from the second vehicle for a period of time greater than a predefined threshold, predict the connect to the second vehicle.

17. The first vehicle of claim 14, wherein the processor is further programmed to, responsive to receiving, from the second vehicle, a request to re-optimize the network configuration, modify activation status and transmission power of at least one network technology.

18. The first vehicle of claim 14, wherein the wireless connection between the first vehicle and the second vehicle includes at least one of: a dedicated short rage communications (DSRC) connection, a WiFi connection, a Bluetooth connection, a near field communication (NFC) connection, and a radio frequency identification (RFID) connection.

19. The first vehicle of claim 14, wherein the first network technology is fourth generation of broadband cellular network technology (4G).

\* \* \* \* \*